ID [19]
United States Patent
Fukui et al.

[11] Patent Number: 4,600,762
[45] Date of Patent: Jul. 15, 1986

[54] RANDUM 1-BUTENE COPOLYMER

[75] Inventors: Kunisuke Fukui, Hiroshima; Norio Kashiwa, Iwakuni, both of Japan

[73] Assignee: Mitsui Petrochemical Industries, Ltd., Tokyo, Japan

[21] Appl. No.: 639,069

[22] Filed: Aug. 9, 1984

[30] Foreign Application Priority Data

Aug. 12, 1983 [JP] Japan ................................ 58-146491

[51] Int. Cl.$^4$ .............................................. C08F 10/08
[52] U.S. Cl. .................................................... 526/348.6
[58] Field of Search ...................................... 526/348.6

[56] References Cited

U.S. PATENT DOCUMENTS

| | | | |
|---|---|---|---|
| 3,332,921 | 7/1967 | Cleary | 526/155 |
| 4,168,361 | 9/1979 | Oda et al. | 526/348.6 |
| 4,398,006 | 8/1983 | Tsubaki et al. | 526/348.6 X |
| 4,442,276 | 4/1984 | Kashiwa et al. | 526/125 |

FOREIGN PATENT DOCUMENTS 1084953   9/1967   United Kingdom ............. 526/348.6

*Primary Examiner*—Paul R. Michl
*Attorney, Agent, or Firm*—Sherman and Shalloway

[57] ABSTRACT

A random copolymer consisting essentially of more than 60 to 99 mole % of 1-butene and less than 40 to 1 mole % of propylene, and having
(A) a boiling methyl acetate-soluble content of not more than 2% by weight based on the weight of the copolymer,
(B) an intrinsic viscosity $[\eta]$, determined in decalin at 135° C., of 0.5 to 6 dl/g,
(C) a n-decane/acetone (1:1 by volume) mixture-soluble content in % by weight based on the weight of the copolymer of less than the value calculated by $4 \times [\eta]^{-1.2}$,
(D) a DSC melting point, determined by a differential scanning calorimeter, of 50° to 130° C.,
(E) a yield strength, measured by JIS K-7113, of 50 to 300 kg/cm$^2$,
(F) an elongation at break, measured by JIS K-7113, of 200 to 1000%, and
(G) a tensile strength at break, measured by JIS K-7113, of 150 to 800 kg/cm$^2$.

12 Claims, No Drawings

RANDUM 1-BUTENE COPOLYMER

This invention relates to a novel random copolymer composed of a major amount of 1-butene and a minor amount of propylene having a combination of characteristics. Because of the combination of characteristics, the random 1-butene copolymer of the invention not described in the known prior literature is useful for providing shaped articles having improved transparency, freedom from surface tackiness, good rigidity and other desirable properties over conventional random 1-butene copolymers. For example, it is suitable for the provision of packaging film or sheet structures having see-through property, blocking resistance and heat sealing property, and other melt-shaped articles.

More specifically, this invention relates to a random copolymer consisting essentially of more than 60 mole % to 99 mole % of 1-butene and less than 40 mole % to 1 mole % of propylene, preferably 65 to 96 mole % of 1-butene and 35 to 4 mole % of propylene, and having the following characteristics (A) to (G) in combination:

(A) a boiling methyl acetate-soluble content of not more than 2% by weight based on the weight of the copolymer, (B) an intrinsic viscosity $[\eta]$, determined in decalin at 135° C., of 0.5 to 6 dl/g, (C) a n-decane/acetone (1:1 by volume) mixture-soluble content in % by weight based on the weight of copolymer of less than the value calculated by $4 \times [\eta]^{-1.2}$, (D) a DSC melting point, determined by a differential scanning calorimeter, of 50° to 130° C., (E) a yield strength, measured by JIS K-7113, of 50 to 300 kg/cm$^2$, (F) an elongation at break, measured by JIS K-7113, of 200 to 1000%, and (G) a tensile strength at break, measured by JIS K-7113, of 150 to 800 kg/cm$^2$.

The use of vinyl chloride resins has predominated in applications which require soft or semirigid resins. However, the vinyl chloride resins have the defect that when articles made of these resins are incinerated for disposal, a corrosive toxic gas is generated, or the toxic monomer remaining in the articles and the plasticizers incorporated in the resins become hazardous. It has been desired therefore to utilize olefinic resins free from these troubles.

Most of the olefinic resins utilized heretofore in these applications are those composed mainly of ethylene. Polymers composed mainly of propylene or 1-butene which have been used in these applications are limited to rigid ones. In order to provide soft polymers composed mainly of propylene or 1-butene, it is necessary to incorporate rubbers or softening agents. The incorporation of these materials involves operational and equipment disadvantages, and moreover, it is difficult to perform the desired softening of the olefin resins without substantially deteriorating their desirable properties. In addition, olefin resins or soft olefin resins alone which have been supplied or known heretofore cannot be used in all applications, and it has been desired to provide soft resins having various different properties.

A soft polymer composed mainly of 1-butene has been proposed heretofore. For example, many proposals have been made on soft random copolymers of 1-butene and propylene. Random copolymers produced by using titanium trichloride or titanium tetrachloride-type catalysts are disclosed in U.S. Pat. Nos. 3,278,504, 3,332,921 and 4168361 and British Pat. Nos. 1018341 and 1084953. These random copolymers, however, cannot be shaped into articles having a high merchandise value because they have a broad composition distribution, a broad molecular weight distribution, and have a high boiling methyl acetate-soluble content and surface tackiness. Many of them have low randomness and poor transparency.

U.S. Pat. No. 3,278,504 shows a propylene/1-butene copolymer having a 1-butene content of 30 to 70 mole %. The Patent states that the copolymer is produced by using titanium tetrachloride or titanium trichloride. Copolymers produced with such a catalyst system usually have a boiling methyl acetate-soluble content of more than 2.0% by weight, and are tacky and have poor transparency.

U.S. Pat. No. 3,332,921 and British Pat. No. 1,084,953 disclose copolymers of varying 1-butene contents produced by using a titanium trichloride catalyst. Of these copolymers, those having a butene content of 60 to 99 mole % have the same properties as the copolymers described in the above-cited U.S. Pat. No. 3,278,504.

According to the disclosure of British Pat. No. 1,018,341, copolymers having a 1-butene content of 25 to 90 mole % are obtained by using a combination of a transition metal halide such as titanium trichloride and a phosphoric acid derivative. The Patent discloses copolymers having a 1-butene content of 60 to 90 mole % and an acetone soluble content of at least 1.5% by weight. These copolymers have a boiling methyl acetate-soluble content of more than 2% by weight.

The random copolymer of propylene and 1-butene of U.S. Pat. No. 4,168,361 has a propylene content of 40 to 90.mole %. This copolymer does not have the characteristic (C) of the copolymer of this invention and does not have the improved properties of the random 1-butene copolymer of the present invention.

A process for producing an amorphous random copolymer by performing polymerization at high temperatures using a titanium trichloride-type catalyst is disclosed in Japanese Laid-open Patent Publication No. 38787/1975. The polymer obtained by this process has a methyl acetate-soluble content of more than 2.0% and a tensile strength of less than 100 kg/cm$^2$, and cannot be used in applications which resins normally find.

A process for the production of an amorphous random, copolymer using a vanadium-type catalyst is also known. But the resulting copolymer generally has no melting point observed and its tensile strength is low.

Japanese Laid-Open Patent Publication No. 85293/1979 proposes a 1-butene-propylene random copolymer having a major proportion of 1-butene, a narrow composition distribution, a low boiling methyl acetate-soluble content and freedom from surface tackiness. Investigations of the present inventors have shown however that the 1-butene/propylene random copoymer provided by this proposal still has a large proportion of low-molecular-weight components, and a shaped article, such as a film, of a resin composition composed of this copolymer (added for improvement of impact strength) and a polypropylene resin increases in surface tackiness with time. Furthermore, since the copolymer of this proposal, has a low crystallinity and has low rigidity, it is unsuitable for applications which require rigidity.

The present inventors have made investigations on a random 1-butene copolymer which is useful for the preparation of shaped articles having a combination of excellent transparency, excellent freedom from surface tackiness, good rigidity and other desirable properties as compared with conventional random 1-butene copolymers. Consequently, they succeeded in synthesizing a random copolymer consisting essentially of more than 60 to 99 mole % of 1-butene and less than 40 to 1 mole % of propylene which has the aforesaid characteristics (A) to (G) and is not described in the known prior literature.

It is an object of this invention, therefore, to provide a novel random 1-butene copolymer consisting essentially of a predominant amount of 1-butene and a minor amount of propylene.

The above and other objects of this invention will become more apparent from the following description.

According to this invention, there is provided a random copolymer consisting essentially of more than 60 to 99 mole %, preferably 65 to 96 mole %, of 1-butene and less than 40 to 1 mole %, preferably 35 to 4 mole %, of propylene, and having (A) a boiling methyl acetate-soluble content of not more than 2% by weight based on the weight of the copolymer, (B) an intrinsic viscosity $[\eta]$, determined in decalin at 135° C., of 0.5 to 6 dl/g, (C) a n-decane/acetone (1:1 by volume) mixture-soluble content in % by weight based on the weight of the copolymer of less than the value calculated by $4 \times [\eta]^{-1.2}$, (D) a DSC melting point, determined by a differential scanning calorimeter, of 50° to 130° C., (E) a yield strength, measured by JIS K-7113, of 50 to 300 kg/cm$^2$, (F) an elongation at break, measured by JIS K-7113, of 200 to 1000%, and (G) a tensile strength at break, measured by JIS K-7113, of 150 to 800 kg/cm$^2$.

It is known that a homopolymer of 1-butene has three types of crystal forms (I, II and III), and crystal transition occurs when the temperature or time varies. Since transition from the II-form to the I-form is slow at room temperature, various difficulties such as changes in properties with time arise in actual use of the 1-butene homopolymer. Since in the copolymer of this invention, propylene is randomly copolymerized with 1-butene, the transitron from the II-form to the I-form rapidly proceeds, and changes of properties with time are little. This is one advantage of the copolymer of this invention.

The random 1-butene copolymer of this invention consists essentially of more than 60 to 99 mole %, preferably 65 to 96 mole %, of 1-butene and less than 40 to 1 mole %, preferably 35 to 4 mole %, of propylene. If the propylene content is larger than the above specified limit, the copolymer has a low crystallinity and its rigidity is reduced. Furthermore, the amount of low-molecular-weight components increases and results in an increase in the boiling methyl acetate-soluble content or the n-decane/acetone mixture-soluble content. As a result, a shaped article prepared from the copolymer has increased tackiness. If, on the other hand, the proportion of propylene is smaller than the above-specified lower limit, the speed of transition from the II-form to the I-form is slow at room temperature, and the same defects as the homopolymer of 1-butene arise. Accordingly, the propylene content is selected within the above-specified range.

The copolymer of this invention has (A) a boiling methyl acetate-soluble content of not more than 2% by weight, preferably not more than 1% by weight, more preferably not more than 0.5% by weight, based on the weight of the copolymer.

The boiling methyl acetate-soluble content (A) is one measure of the narrowness of the composition distribution and the molecular weight distribution of the random 1-butene copolymer of this invention. Conventional copolymers have a higher boiling methyl acetate-soluble content, and therefore, have high surface tackiness. The boiling methyl acetate-soluble content (A), in combination with the other characterisitics, is useful for providing a shaped article having the aforesaid combination of improved properties.

The boiling methyl acetate-soluble content (A) is determined by the following method.

A sample with a size of about 1 mm × 1 mm × 1 mm is placed in a cylindrical glass filter and extracted with boiling methyl acetate for 7 hours by a Soxhlet extractor with a refluxing frequency of about 1 time/5 minutes. The extraction residue is dried in a vacuum dryer (degree of vacuum less than 10 mmHg) until its amount becomes constant. The weight of the dried extraction residue is measured, and the boiling methyl acetate-soluble content (A) is calculated.

The random 1-butene copolymer of the invention has (B) an intrinsic viscosity $[\eta]$, determined in decalin at 135° C., of 0.5 to 6 dl/g, preferably 1 to 5 dl/g. The intrinsic viscosity (B) is a measure of the molecular weight of the copolymer of this invention and in combination with the other characterisitics, is useful for providing a shaped article having the aforesaid excellent properties.

The random 1-butene copolymer of this invention has (C) a n-decane/acetone (1:1 by volume) mixture-soluble content in % by weight based on the weight of the copolymer of less than the value calculated by $4 \times [\eta]^{-1.2}$, preferably less than the value calculated by $3.5 \times [\eta]^{-1.2}$ (%). The $[\eta]$ means the value (excepting the dimension) of the intrinsic viscosity (B). The characteristic (C) is a measure which shows that the random 1-butene copolymer of the invention has a small amount of low-molecular-weight components and a more uniform composition distribution. In combination with the other characterisitics, the characteristic (C) is useful for providing a shaped article having the aforesaid excellent properties, particularly reduced surface tackiness and good rigidity.

The soluble content (%) (C) is determined by the following method.

A 150 ml. flask equipped with a stirring vane is charged with 1 g of a copolymer sample, 0.05 g of 2,6-di-t-butyl-4-methylphenol and 50 ml of n-decane, and they are dissovled by using an oil bath at 120° C. After the dissolving, the solution is left to stand at room temperature for 30 minutes to cool it spontaneously. Then, 50 ml of acetone is added over the course of 30 seconds, and then cooled for 60 minutes with a water bath at 10° C. The precipitated polymer is separated from the solution containing the dissolved low-molecular-weight components by filtration on a glass filter. The solution is dried at 150° C. and 10 mmHg until its weight becomes constant, and its weight is measured. The soluble content (% by weight) of the copolymer sample in the mixture of decane and acetone is calculated. In the above procedure, the stirring is carried out continuously from the time of dissolving until immediately before the filtration.

The random 1-butene copolymer of this invention has (D) a DSC melting point [Tm±°C.)], determined by a differential scanning calorimeter, of 50° to 130° C., preferably 70° to 125° C.

The presence of the DSC melting point is a measure which shows that the copolymer has a crystallinity distinguishable from conventional amorphous copolymers. In combination with the other charactersitics, the characteristic (D) is useful for providing a shaped article having the aforesaid excellent properties.

The amount of the heat of fusion by DSC thermal analysis is a measure of such crystallinity. Usually, the random 1-butene copolymer has an amount of the heat of fusion of, for example, 5 to 100 joules/g. The amount of the heat of fusion is calculated by using as a base line a straight line which is obtained by extrapolating the specific heat curve in the completely melted state to a lower temperature side.

X-ray diffraction of the random 1-butene copolymer having the characteristic (D) shows the diffraction pattern of a crystal.

The characteristic (D) and the amount of the heat of fusion can be determined as follows:-

A copolymer sample is left to stand at 200° C. for 5 minutes, cooled to −40° C. at a rate of 10° C./min., and then left to stand at −40° C. for 5 minutes. Thereafter, the sample is analyzed by a differential scanning calorimeter at a temperature of −40° to 200° C. at a temperature elevating rate of 20° C./min.

The random 1-butene copolymer of this invention further has (E) a yield strength measured by JIS K-7113, 50 to 300 kg/cm$^2$, preferably not less than 100 kg/cm$^2$, more preferably 110 to 200 kg/cm$^2$.

The random 1-butene copolymer of this invention also has (F) an elongation at break, measured by JIS K-7113, of 200 to 1000%, preferably not less than 300%, more preferably 350 to 1000%, and (G) a tensile strength at break, measured by JIS K-7113, of 150 to 800 kg/cm$^2$, preferably not less than 200 kg/cm$^2$, more preferably 250 to 600 kg/cm$^2$, especially 300 to 500 kg/cm$^2$.

These characteristics (E), (F) and (G), in combination with the other characteristics, are useful for providing a shaped article having the aforesaid excellent properties.

In measuring the yield strength (E), the elongation at break (F), and the tensile strength at break (G), those tensile tests are carried out in accordance with the method of JIS K-7113. Specifically, the sample used is a No. 2 sample in accordance with JIS K-7113 which is punched out 19 hours after the molding from a 1 mm-thick press sheet molded in accordance with JIS K6758. Those tensile tests are conducted in an atmosphere at 25° C. at a tensile speed of 50 mm/min. twenty hours after the formation of the press sheet.

When no clear yield point appears, the 20% elongation stress is made the yield point stress, and the yield strength (E) is determined.

Preferably, the random 1-butene copolymer of this invention has the characteristics (H) to (J) in addition to the above characteristics (A) to (G).

(H) A torsional rigidity, measured by JIS K6745, of 500 to 3,000 kg/cm$^2$, preferably 500 to 2,000 kg/cm$^2$.

(I) A Young's modulus, measured by JIS K-7113, of 1,000 to 6,000 kg/cm$^2$, more preferably 1,200 to 6,000 kg/cm$^2$, especially preferably 1,500 to 5,000 kg/cm$^2$.

(J) A standard deviation ($\sigma$) of the distribution of the 1-butene content of not more than 15 mole %, preferably not more than 10 mole %.

The torsional rigidity (H) and the Young's modulus (I) are measures of the rigidity of a shaped article of the copolymer. The random 1-butene copolymer of this invention shows more desirable properties when it has characteristics (H) and/or (I) in addition to the characteristics (A) to (G).

The torsional rigidity (H) is measured by a method substantially in accordance with JIS K-6745. Specifically, a rectangular sample, 64 mm long and 6.35 mm wide, is punched out 9 days after molding from a 1 mm-thick press sheet molded in accordance with JIS K6758. Ten days after the molding of the press sheet, the rigidity of the sample is measured in an atmosphere at 25° C. at a torsional angle of 50° to 60° after the lapse of 5 seconds from the application of a load.

The Young's modulus is measured by the same method as in the tensile test.

The standard deviation (J) is a measure of the randomness of the random 1-butene copolymer of this invention, and gives more desirable properties to the random 1-butene copolymer when taken together with the characteristics (A) to (G).

The distribution of the random 1-butene copolymer is determined by an elution fractionation method using a column by changing the eluting temperature stepwise (at intervals of 5° C.) from 10° C. to 130° C. using p-xylene as a solvent. At this time, a fraction at each temperature is eluted for 4 hours using 2 liters of p-xylene for 10 g of more than ten fractions. The standard deviation ($\sigma$) is defined by the following equation.

$$\sigma = \left[ \int_0^{100} (\bar{X} - X)^2 f(x) dx \right]^{\frac{1}{2}}$$

wherein $\bar{X}$ is the averge content (mole %) of 1-butene in the copolymer, X is the content (mole %) of 1-butene, and f(x) is the differential distribution function of weight for a component with a content of X (mole %).

Preferably, the copolymer of this invention has a 1-butene content of 70 to 95 mole % because such a copolymer is moderately soft and its rate of crystal transition at room temperature is high.

The copolymer of this invention may have a very small amount of another alpha-olefin such as ethylene copolymerized therewith so long as the copolymer has the aforesaid properties.

The random 1-butene copolymer of this invention can be obtained by copolymerizing 1-butene and propylene at a temperature of about 20° to about 200° C. in the presence of a catalyst prepared from (i) a highly active titanium catalyst component containing magnesium, titanium, halogen and a diester as essential ingredients, (ii) an organo-aluminum compound, and (iii) an organic silicon compound having an Si-O-C bond.

The catalyst components and the copolymerization conditions can be easily selected and determined experimentally using the characteristics (A) to (G) of the copolymer of this invention as measures. Now that the existence of the random 1-butene copolymer having the characteristics (A) to (G) which is not described in the known prior literature has been disclosed, and the combination of its excellent properties has been clarified, by the present inventors, those skilled in the art would easily understand that those skilled in the art can easily and properly select and determine the conditions for manufacturing the random 1-butene copolymer of the invention by experiments using the charactersitics (A) to (G) and also the characteristics (H) to (J) of the copolymer of this invention.

The highly active titanium catalyst component (i) contains magnesium, titanium, halogen and a diester as essential ingredients. In this titanium catalyst component (i), the magnesium/titanium atomic ratio is preferably from about 2 to about 100, more preferably from about 4 to about 70; the halogen/titanium atomic ratio is preferably from about 4 to about 100, more preferably from about 6 to about 40; and the diester/titanium mole ratio of preferably from about 0.2 to about 10, more preferably from about 0.4 to about 6. The titanium catalyst component (A) has a specific surface area of preferably at least about 3 $m^2/g$, more preferably at least about 40 $m^2/g$, especially preferably from about 100 to about 800 $m^2/g$.

Usually, by a simple means such as washing with hexane at room temperature, the titanum compound is not substantially liberated from the titanium catalyst component (i). The X-ray spectrum of this catalyst component shows amorphousness with regard to the magnesium compound irrespective of the starting magnesium compound used in catalyst preparation, or is preferably more amorphous than an ordinary commercially available magnesium dihalide.

The titanium catalyst component (i) may further contain other elements, metals, functional groups, electron donors, etc. so long as these additional components do not greatly deteriorate the performance of the catalyst. Or it may be diluted with an organic or inorganic diluent. When it contains other elements, metals, diluents, etc. they may sometimes affect the specific surface area or amorphousness. In that case, it is preferred that when such components have been removed, the catalyst shows such a specific surface area and amorphousness.

The titanium catalyst component (i) is prepared preferably by contacting a magnesium compound (or magnesium metal), a titanium compound and a diester or a diester-forming compound with or without other reagents. The preparation can be effected in the same way as in the preparation of known highly active titanium catalyst components containing magnesium, titanium, halogen and an electron donor as essential ingredients. For example, it can be produced in accordance with the methods disclosed in British Patent Specifications Nos. 1492618, 1554340 and 1554248, U.S. Pat. Nos. 4,157,435, 4,076,924, 4,085,276, 4,250,285, 4,232,139, 4,143,223, 4,315,874, 4,330,649, 4,401,589 and 4,335,015, and European Patent Specification No. 22675.

Several embodiments of producing the titanium catalyst component (i) will be illustrated below.

(1) A magnesium compound or a complex of a magnesium compound and an electron donor is pre-treated or not-pretreated with an electron donor and/or a reaction aid such as an organoaluminum compound or a halogen-containing silicon compound in the presence or absence of an electron donor or a pulverization aid with or without pulverization. The resulting solid is reacted with a titanium compound which is in the liquid state under the reaction conditions. In the above procedure, the electron donor is used at least once as the electron donor.

(2) A magnesium compound in the liquid state having no reducing ability is reacted with a titanium compound in the liquid state in the presence of an electron donor to precipitate a solid titanium complex.

(3) The product obtained in (2) above is further reacted with a titanium compound.

(4) The product obtained in (1) or (2) is further reacted with a titanium compound and an electron donor.

(5) A magnesium compound or a complex of a magnesium compound and an electron donor is pulverized in the presence of a titanium compound and in the presence or absence of an electron donor and a pulverization aid, and with or without pre-treatment with an electron donor and/or a reaction aid such as an organoaluminum compound or a halogen-containing silicon compound, treated with a halogen, a halogen compound or an aromatic hydrocarbon. In the above procedure, the electron donor is used at least once.

Preferred among these methods are those in which a liquid titanium halide is used, or a halogenated hydrocarbon is used after or during the use of the titanium compound.

The electron donor used in the above methods of preparation is not necessarily limited to the diester or diester-forming compound. There may be used other electron donors such as alcohols, phenols, aldehydes, ketones, ethers, carboxylic acids, carboxylic acid anhydrides, carbonic acid esters, monoesters and amines.

Preferred examples of the diester as an essential component of the highly active solid titanium catalyst component (i) used in the invention include diesters of dicarboxylic acids in which two carboxyl groups are attached to one carbon atom and dicarboxylic acids in which one carboxyl group is attached to each of the two adjoining carbon atoms. Examples of the dicarboxylic acids in such dicarboxylic acid esters are malonic acid, substituted malonic acid, succinic acid, substituted succinic acid, maleic acid, substituted maleic acid, fumaric acid, substituted fumaric acid, alicyclic dicarboxylic acids in which two carboxyl groups are attached to one carbon atom forming the aliphatic ring, alicyclic dicarboxylic acids in which one carboxyl group is bonded to each of the two adjoining carbon atoms forming the aliphatic ring, aromatic dicarboxylic acids having carboxyl groups at the orthoposition, and heterocyclic dicarboxylic acids having one carboxyl group to each of the two adjoining carbon atoms forming the heterocyclic ring.

Specific examples of the dicarboxylic acids exemplified above include malonic acid; substituted malonic acids such as methylmalonic acid, ethylmalonic acid, isopropylmalonic acid, allylmalonic acid, and phenylmalonic acid; succinic acid: substituted succinic acids such as methylsuccinic acid, dimethylsuccinic acid, ethylsuccinic acid, methylethylsuccinic acid and itaconic acid; maleic acid; substituted maleic acids such as citraconic acid and dimethylmaleic acid; alicyclic dicarboxylic acids such as cyclopentane-1,1-dicarboxylic acid. cyclopentane-1,2-dicarboxylic acid, cyclohexane-1.2-dicarboxylic acid, cyclohexene-1,2-dicarboxylic acid, cyclohexene-2,3-dicarboxylic acid, cyclohexene-3,4-dicarboxylic acid, cyclohexene-4,5-dicarboxylic acid, Nadic Acid, Methylnadic Acid, and 1-allylcyclohexane-3,4-dicarboxylic acid; aromatic dicarboxylic acids such as phthalic acid, naphthalene-1,2-dicarboxylic acid and naphthalene-2,3-dicarboxylic acid; and heterocyclic dicarboxylic acids such as furane-3,4-dicarboxylic acid, 4,5-dihydrofurane-2,3-dicarboxylic acid, benzopyran-3,4-dicarboxylic acid, pyrrole-2,3-dicarboxylic acid, pyridine-2,3-dicarboxylic acid, thiophene-3,4-dicarboxylic acid, and indole-2,3-dicarboxylic acid.

Preferably, at least one of the alcohol components of the dicarboxylic acid diesters exemplified above has at least 2 carbon atoms, especially at least 3 carbon atoms. It is above all preferred that both of the alcohol components have at least 2 carbon atoms, especially at least 3 carbon atoms. Examples include the diethyl esters, diisopropyl esters, di-n-propyl esters, di-n-butyl esters, diisobutyl esters, di-tert-butyl esters, diisoamyl esters, di-n-hexyl esters, di-2-ethylhexyl esters, di-n-octyl esters, diisodecyl esters, and ethyl n-butyl esters of the above-exemplified dicarboxylic acids.

Both a magnesium compound having reducing ability and a magnesium compound having no reducing ability can be utilized in the prepration of the solid highly active titanium catalyst component (A).

The former includes, for example, magnesium compounds having a magnesium-carbon bond or a magnesium-hydrogen bond, for example dimethyl magnesium, diethyl magnesium, dipropyl magnesium, dibutyl magnesium, ethylbutyl magnesium, diamyl magnesium, dihexyl magnesium, didecyl magnesium, ethylmagnesium chloride, propylmagnesium chloride, butylmagnesium chloride, hexylmagnesium chloride, amylmagnesium chloride; ethyl butylmagnesium and butylmagnesium hydride. These magnesium compounds may be used in the form of a complex with an organoaluminum compound, for example, or may be in the form of a liquid or a solid.

The latter includes, for example, magnesium halides such as magnesium chloride, magnesium bromide, magnesium iodide and magnesium fluoride; alkoxymagnesium halides such as methoxymagnesium chloride, ethoxymagnesium chloride, isopropoxymagnesium chloride, butoxymagnesium chloride and octoxymagnesium chloride; aryloxymagnesium halides such as phenoxy magnesium chloride and methylphenoxymagnesium chloride; alkoxymagnesiums such as ethoxy magnesium, isopropoxy magnesium, butoxy magnesium, n-octoxy magnesium, and 2-ethylhexoxy magnesium; aryloxy magnesiums such as phenoxy magnesium and dimethylphenoxy magnesium; and carboxylic acid salts of magnesium such as magnesium laurate and magnesium stearate. These magnesium compounds having no reducing ability may be derived from the aforesaid magnesium compounds having reducing ability, or those derived during the preparation of the catalyst component. The above magnesium compounds may be a complex with other metals or mixtures of other metal compounds. Or they may be a mixture of two or more of these compounds.

Preferred are the magnesium compounds having no reducing ability, and halogen-containing magnesium compounds, particularly, magnesium chloride, alkoxy magnesium chlorides and aryloxymagnesium chlorides are preferred.

Suitable titanium compounds used to prepare the titanium catalyst component (A) are tetravalent titanium compounds represented by Ti(OR)$_g$X$_{4-g}$ in which R is a hydrocarbon group, X is halogen and g is 0 to 4.

Specific examples of such titanium compounds include titanium tetrahalides such as TiCl$_4$, TiBr$_4$ and TiI$_4$; alkoxytitanium trihalides such as Ti(OCH$_3$)Cl$_3$, Ti(OC$_2$H$_5$)Cl$_3$, and Ti(O n-C$_4$H$_9$)Cl$_3$, Ti(OC$_2$H$_5$)Br$_3$ and Ti(O isoC$_4$H$_9$)Br$_3$; alkoxytitanium dihalides such as Ti(OCH$_3$)$_2$Cl$_2$, Ti(OC$_2$H$_5$)$_2$Cl$_2$, Ti(O n-C$_4$H$_9$)$_2$Cl$_2$ and Ti(OC$_2$H$_5$)$_2$Br$_2$; trialkoxytitanium monohalides such as Ti(OCH$_3$)$_3$Cl, Ti(OC$_2$H$_5$)$_3$Cl, Ti(O n-C$_4$H$_9$)$_3$Cl and Ti(OC$_2$H$_5$)$_3$Br; and tetraalkoxytitaniums such as Ti(OCH$_3$)$_4$, Ti(OC$_2$H$_5$)$_4$ and Ti(O n-C$_4$H$_9$)$_4$. Among them, the halogen-containing titanium compounds, particularly titanium tetrahalides, especially preferably titanium tetrachloride, are preferred. These titanium compounds may be used singly or as a mixture. Or they may be used as diluted in hydrocarbons or halogenated hydrocarbons.

In the preparation of the titanium catalyst component (A), the amounts of the titanium compound, the magnesium compound the electron donor to be supported, and the other electron donors such as alcohols, phenols, monocarboxylic acid esters, the silicon compound and the aluminum compound which may used as required differ depending upon the method of preparation and cannot be defined in a general manner. For example, about 0.1 to about 10 moles of the electron donor to be supported and about 0.05 mole to about 1000 moles of the titanium compound may be used per mole of the magnesium compound.

In the present invention, a catalyst composed of the solid highly active titanium catalyst component (i) described above, (ii) an organoaluminum compound and (iii) an organic silicon compound having an Si-O-C bond is used.

Examples of the organoaluminum compound (ii) include (a) organoaluminum compounds at least having an Al-carbon bond in the molecule, for example organoaluminum compounds represented by the general formula $$R^1_m Al(OR^2)_n H_p X_q$$

wherein each of R$^1$ and R$^2$, which may be identical or different, represents a hydrocarbon, for example a C$_1$–C$_{15}$ hydrocarbon group, preferably C$_1$–C$_4$ hydrocarbon group, X represents a halogen atom such, $0<m\leq3$, $0\leq n<3$, $0\leq p<3$, $0\leq q<3$, provided that $m+n+p+q=3$, and (b) complex alkylated products of aluminum and a metal of Group I of the periodic table represented by the following general formula $$M^1 AlR^1_4$$

wherein M$^1$ is Li, Na or K, and R is as defined above. Examples of the organoaluminum compounds (a) are those of the general formulae $$R^1_m Al(OR^2)_{3-m}$$

wherein R$^1$, R$^2$ and X are as defined above, and m is preferably a number represented by $0<m<3$.

$$R^1_m AlH_{3-m}$$

wherein R$^1$ is defined above, and m is preferably a number represented by $2\leq m<3$, $$R^1_m Al(OR^2)_n X_q$$

wherein R$^1$, R$^2$ and X are as defined above, $0<m\leq3$, $0\leq n<3$, $0\leq q<3$, $m+n+q=3$.

Examples of the organoaluminum compounds (a) include trialkyl aluminums such as triethyl aluminum and tributyl aluminum; trialkenyl aluminums such as triisoprenyl aluminum; dialkyl aluminum alkoxides such as diethyl aluminum ethoxide and dibutyl aluminum butoxide; partially alkoxylated alkyl aluminums such as alkyl aluminum sesquialkoxides (e.g., ethyl aluminum sesquiethoxide and butylaluminum sesquibutoxide) and partially alkoxylated alkyl aluminums having the average composition represented by $R^1{}_{2.5}Al(OR^2)_{0.5}$; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; partially halogenated alkyl aluminums, for example alkyl aluminum dihalides such as ethyl aluminum dichloride, propyl aluminum dichloride and butyl aluminum dibromide; other partially halogenated alkyl aluminums, for example alkyl aluminum dihydrides such as ethyl aluminum dihydride and propyl aluminum dihydride; and partially alkoxylated and halogenated alkyl aluminums such as ethyl aluminum ethoxychloride, ethyl aluminum butoxy chloride and ethyl aluminum ethoxy bromide.

$LiAl(C_2H_5)_4$ and $LiAl(C_7H_{15})_4$ may be cited as examples of the compounds (b).

There may also be used organic aluminum compounds in which two or more aluminum atoms are bonded through an oxygen or nitrogen atom, which are similar to the compounds (a). Examples are $(C_2H_5)_2AlOAl(C_2H_5)_2$, $(C_4H_9)_2AlOAl(C_4H_9)_2$, and $$(C_2H_5)_2Al\underset{\underset{C_2H_5}{|}}{N}Al(C_2H_5).$$

Of these, the trialkyl aluminums and the alkyl aluminums in which two or more aluminum atoms are bonded are preferred.

Illustrative of the organic silicon compound (iii) having an Si-O-C are alkoxysilanes and aryloxysilanes. For example, there may be cited organic silicon compounds represented by the following general formula $$R_nSi(OR^1)_{4-n}$$

wherein R represents a hydrocarbon group, such as an alkyl, cycloalkyl, aryl, alkenyl, haloalkyl, or aminoalkyl group, or halogen, $R^1$ represents a hydrocarbon group such as an alkyl, cycloalkyl, aryl, alkenyl or alkoxyalkyl group, and n is a number representd by $0 \leq n \leq 3$, and n R groups, or $(4-n)OR^1$ groups may be identical or different.

Other examples of the catalyst component (iii) include siloxanes having the group $OR^1$ and silyl esters of carboxylic acid. Compounds in which two or more silicon atoms are bonded to each other through an oxygen or nitrogen atom may be cited as still another example. There may also be used the product of reaction of a compound having no Si-O-C bond with a compound having an O-C bond obtained either in advance or in situ. There can be cited the combined use of a halogen-containing silane compound containinig no Si-O-C bond or silicon hydride with an alkoxy group-containing aluminum compound, an alkoxy group-containing magnesium compound, a metal alcoholate, an alcohol, a formic acid ester, ethylene oxide, etc. The organic silicon compounds may also include other metals such as aluminum or tin.

Specific examples of preferred organic silicon compounds as component (iii) include trimethylmethoxysilane, trimethylethoxysilane, dimethyldimethoxysilane, dimethyldiethoxysilane, diphenyldimethoxysilane, methylphenyldimethoxysilane, diphenyldiethoxysilane, ethyltrimethoxysilane, methyltrimethoxysilane, vinyltrimethoxysilane, phenyltrimethoxysilane, gamma-chloropropyltrimethoxysilane, methyltriethoxysilane, ethyltriethoxysilane, vinyltriethoxysilane, butyltriethoxysilane, phenyltriethoxysilane, gamma-aminopropyltriethoxysilane, chlorotriethoxysilane, ethyltriisopropoxysilane, vinyltributoxysilane, ethyl silicate, butyl silicate, trimethylphenoxysilane, methyltriallyloxysilane, vinyltris(beta-methoxyethoxy)silane, vinyltriacetoxysilane, dimethyltetraethoxydisiloxane and phenyldiethoxydiethylaminosilane. Of these, methyltrimethoxysilane, phenyltrimethoxysilane, methyltriethoxysilane, ethyltriethoxysilane, vinyltriethoxysilane, phenyltriethoxysilane, vinyltributoxysilane, ethyl silicate, diphenyldimethoxysilane, diphenyldiethoxysilane and methylphenylmethoxysilane (the compounds of formula $R_nSi(OR^1)_{4-n}$ given above in which n is preferably 0 (or 1) are especially preferred.

The copolymerization of 1-butene and propylene can be carried out in any of the liquid phase and the vapor phase. Preferably, it is carried out in the liquid phase under such conditions that the copolymer dissolves. When the copolymerization is to be carried out in the liquid phase, an inert solvent such as hexane, heptane or kerosene may be used as a reaction medium. The olefins themselves may be used as the reaction medium, too. The amount of the catalyst used is such that per liter of the reaction volume, the component (i) is used in an amount of about 0.0001 to about 1.0 millimole as titanium atom, the component (ii) is used in an amount as the metal atom therein of about 1 to about 2000 moles, preferably about 5 to about 500 moles, per mole of the titanium atom in the component (i), and the component (iii) is used in an amount as the Si atom therein of about 0.001 to about 0 moles, preferably about 0.01 to about 2 moles, especially preferably about 0.05 to about 1 mole, per mole of the metal atom in the component (ii).

During the copolymerization, the three catalyst components (i), (ii) and (iii) may be contacted together. Or they may be contacted together before the copolymerization. In contacting them before the copolymerization, any desired two may be selected and contacted, or portions of two or three may be contacted with each other. Furthermore, the contacting of the components before the copolymerization may be carried out in an atmosphere of an inert gas, or in an atmosphere of an olefin.

The copolymerization temperature may be properly chosen, and is preferably about 20° to about 200° C., more preferably about 50° to about 180° C. The pressure is from atmospheric pressure to about 100 kg/cm², preferably about 2 to about 50 kg/cm². The ratio between 1-butene and propylene fed for producing a copolymer having a propylene content of more than 1 mole % but not exceeding 40 mole % can be properly chosen depending upon the polymerization pressure. For example, the mole ratio of 1-butene to propylene is from about 1 to about 1000.

The molecular weight can be controlled to some extent by changing the polymerization conditions such as the polymerization temperature and the proportions of the catalyst components. The addition of hydrogen to the polymerization system is most effective.

The random 1-butene copolymer differs from those previously proposed in that it is free from tackiness and the various other excellent properties described herereinabove. The random 1-butene copolymer can be shaped into various articles such as pipes, films, sheets and hollow containers by any known shaping methods such as extrusion, blow molding, injection molding, press forming and vacuum forming. It is especially suitable as packaging films because of its good antiblocking property and heat sealing property. Because of the aforesaid properties, it can also be suitably used as a protective film for metals and the like. It can also be used suitably as hot water supply pipes because of its high yield strength.

In shaping the copolymer of this invention, it is possible to incorporate various stabilizers, antioxidants, ultraviolet absorbers, antistatic agents, slip agents, plasticizers, pigments and inorganic or organic fillers. Examples include 2,6-di-tert-butyl-p-cresol, tetrakis-[methylene-3-(3,5-di-tert-butyl-4-hydroxyphenyl)propionate] methane, 4,4'-butylidenebis(6-tert-butyl-m-cresol), tocopherols, ascorbic acid, dilauryl thiodipropionate, phosphoric acid-type stabilizers, fatty acid monoglycerides, N,N-(bis-2-hydroxyethyl)alkylamines, 2-(2'-hydroxy-3',5'-di-tert-butylphenyl)-5-chlorobenzotriazole, calcium stearate, magnesium oxide, magnesium hydroxide, alumina, aluminum hydroxide, silica, hydrotalcite, talc, clay, gypsum, glass fibers, titania; calcium carbonate; carbon black, petroleum resins, polybutene, waxes, and synthetic or natural rubbers.

The copolymer of this invention may be used as a mixture with another thermoplastic resin. Examples of the thermoplastic resin include high density, medium-density and low-density polyethylenes, polypropylene, poly-1-butene, poly-4-methyl-1-pentene, ethylene/vinyl acetate copolymer, Sarlyn A, ethylene/vinyl alcohol copolymer, polystyrene and maleic acid-grafted products of these.

The following examples illustrate the present invention more specifically.

EXAMPLE 1

Preparation of titanium catalyst component (i):

Anhydrous magnesium chloride (4.76 g; 50 millimoles), 25 ml of decane and 23.4 ml (150 millimoles) of 2-ethylhexyl alcohol were reacted at 130° C. for 2 hours to form a uniform solution. Phthalic anhydride (1.11 g; 7.5 millimoles) was added to the solution, and the mixture was stirred further at 130° C. for 1 hour to dissolve phthalic anhydride in the uniform solution. The resulting uniform solution was cooled to room temperature, and added dropwise to 200 ml (1.8 moles) of titanium tetrachloride held at $-20°$ C. over the course of 1 hour. After the addition, the mixed solution was heated to 110° C. over the course of 4 hours. When the temperature reached 110° C., 2.68 ml (12.5 millimoles) of diisobutyl phthalate was added. The mixture was maintained at the same temperature for 2 hours with stirring. After the 2-hour reaction, the reaction mixture was hot-filtered. The collected solid portion was suspended in 200 ml of $TiCl_4$, and again reacted at 110° C. for 2 hours. After the reaction, the solid portion was collected again by hot filtration and washed fully with decane and hexane at 110° C. until no free titanium compound was detected in the washings. The titanium catalyst component (i) prepared by the above method was stored as a hexane slurry. A part of it was dried for the purpose of examining its composition. The composition of the titanium catalyst component (i) was 3.1% by weight of titanium, 56.0% by weight of chlorine, 17.0% by weight of magnesium and 20.9% by weight of diisobutyl phthalate.

Polymerization:

1-Butene and propylene were copolymerized continuously in a 20 liter SUS stainless steel polymerization vessel equipped with stirring blades. Specifically, from the top portion of the polymerization vessel, 1-butene and propylene were continuously fed at a rate of 5 kg and 100 g per hour respectively. From the bottom portion of the polymerization vessel, the polymer solution was continuously withdrawn so that the amount of the polymer solution during the polymerization would always become 10 liters.

As a catalyst, the titanium catalyst component (i), triethyl aluminum and vinyltriethoxysilane were continuously sly fed into the polymerization vessel at a rate of 0.03 millimole, 10 millimoles, and 0.5 millimole per hour respectively. Hydrogen was continuously fed into the vessel so that the partial pressure of hydrogen in the vapor phase in the upper portion of the polymerization vessel became 1.0 kg/cm².

During the copolymerization, the temperature of the inside of the polymerization vessel was maintained at 60° C. by feeding cooling water into a jacket attached to the exterior portion of the polymerization vessel.

The unreacted 1-butene and propylene were removed under atmospheric pressure from the polymer solution withdrawn from the bottom portion of the polymerization vessel, and the resulting polymer was dried under pressure for 24 hours at 100° C.

The above operation gave 1-butene/propylene copolymer at a rate of 580 g per hour. The results of the polymerization are summarized in Table 1.

EXAMPLES 2 to 4

The same polymerization as in Example 1 was carried out except that the amount of propylene fed was changed as shown in Table 1. The results are summarized in Table 1.

COMPARATIVE EXAMPLES 1 AND 2

As a catalyst, titanium trichloride (TAC-141 produced by Toho Titanium Co., Ltd.) and diethyl aluminum chloride were fed at a rate of 10 millimoles and 20 millimoles per hour respectively, and propylene in the amount indicated in Table 1 was fed. Otherwise, the same procedure as in Example 1 was repeated. The results are summarized in Table 1.

COMPARATIVE EXAMPLE 3

Preparation of a titanium catalyst component:

Anhydrous magnesium chloride (20 g), 5.0 ml of ethyl benzoate and 3.0 ml of methylpolysiloxane (viscosity 100 cs.) were charged into a stainless steel ball mill container having an inner capacity of 800 ml and an inside diameter of 100 mm and holding 2.8 kg of stainless steel balls having a diameter of 15 mm under a nitrogen atmosphere, and contacted for 24 hours at an impact acceleration of 7G. Twenty grams of the resulting copulverization product was suspended in 200 ml of titanium tetrachloride, and contacted at 80° C. for 2 hours with stirring. The solid portion was filtered on a glass filter while it was hot. The filtrate was fully washed with purified hexane until no free titanium tetrachloride was detected in the washing. The washed product was dried under reduced pressure to form a titanium complex.

It contained 1.9% by weight of titanium atom, 65% by weight of chlorine atom, 23% by weight of metallic magnesium atom and 7.7% by weight of ethyl benzoate.

Polymerization:

The titanium catalyst component, triethyl aluminum and methyl p-toluate were fed at a rate of 0.2 millimole, 10 millimoles and 3.3 millimoles per hour respectively, and propylene was fed in the amount indicated in Table 1. Otherwise, the procedure of Example 1 was repeated. The results are summarized in Table 1.

EXAMPLE 5

The polymerization in Example 1 was carried out by additionally feeding 10 g/hr of ethylene. The results are summarized in Table 1.

EXAMPLE 6

Example 3 was repeated except that the partial pressure of hydrogen was changed to 2.0 kg/cm2 The results are summarized in Table 1.

COMPARATIVE EXAMPLE 4

Comparative Example 3 was repeated except that the partial pressure of hydrogen was changed to 2.5 kg/cm$^2$, and the amount of propylene fed was changed to 0.35 kg/hr. The polymerization results are shown in Table 1.

truder having a screw diameter of 30 mm at a molding temperature of 200° to 250° C.

The blocking property of this film was examined as follows:

The antiblocking property was evaluated in accordance with ASTM D1893. Films having a width of 10 cm and a length of 15 cm were superimposed and held by two glass sheets. A load of 10 kg was exerted on the assembly, and the assembly was left to stand in an air oven at 50° C. The sample was taken out 1 day and 7 days later, and its peel strength was measured by a universal tester. The peel strength per cm was defined as the blocking value.

The 1-butene/propylene copolymer obtained in Comparative Example 4 was subjected to the same operation as above, and the blocking property of a stretched film obtained from a blend of it with a polypropylene resin was examined.

The results are shown in Table 2.

TABLE 2

| 1-Butene/propylene | Blocking value (g/cm) | |
|---|---|---|
| copolymer | 1 day later | 7 days later |
| Example 6 | 3.2 | 4.5 |
| Comparative Example 4 | 4.1 | 9.6 |

TABLE 1

| | Monomers fed | | Propylene content (mole %) | Methyl-acetate soluble content (%) | Standard deviation (mole %) | Melting point (°C.) | Intrinsic viscosity [η] (dl/g) |
|---|---|---|---|---|---|---|---|
| | 1-Butene (kg/hr) | Propylene (kg/hr) | | | | | |
| Example 1 | 5.0 | 0.1 | 5.3 | 0.13 | 3.5 | 123 | 3.7 |
| Example 2 | " | 0.2 | 10.2 | 0.16 | 3.7 | 117 | 3.4 |
| Example 3 | " | 0.4 | 21.6 | 0.24 | 3.4 | 113 | 3.0 |
| Example 4 | " | 0.6 | 32.4 | 0.31 | 3.5 | 98 | 2.8 |
| Comp. Example 1 | " | 0.2 | 13.6 | 2.3 | 14.6 | 116 | 3.6 |
| Comp. Example 2 | " | 0.4 | 29.0 | 2.9 | 16.3 | 101 | 3.3 |
| Comp. Example 3 | " | " | 25.3 | 0.15 | 4.2 | 103 | 3.1 |
| Example 5 | " | Propylene 0.1 | 4.8 | 0.17 | — | 121 | 3.6 |
| | | Ethylene 0.01 | 0.7 | | | | |
| Example 6 | " | 0.4 | 20.8 | 0.32 | 3.5 | 114 | 2.1 |
| Comp. Example 4 | " | 0.35 | 19.4 | 0.35 | 4.0 | 110 | 1.9 |

| | Yield strength (kg/cm$^2$) | Elongation at break (%) | Tensile strength (kg/cm$^2$) | Torsional rigidity (kg/cm$^2$) | Young's modulus (kg/cm$^2$) | n-Decane/acetone mixture soluble content (%) | $4 \times [\eta]^{-1.2}$ |
|---|---|---|---|---|---|---|---|
| Example 1 | 158 | 400 | 480 | 1500 | 3100 | 0.4 | 0.83 |
| Example 2 | 147 | 410 | 460 | 1400 | 2900 | 0.5 | 0.92 |
| Example 3 | 125 | 390 | 410 | 1300 | 2500 | 0.5 | 1.07 |
| Example 4 | 106 | 350 | 350 | 1100 | 2100 | 0.6 | 1.16 |
| Comp. Example 1 | 62 | 430 | 330 | 650 | 1300 | 2.1 | 0.85 |
| Comp. Example 2 | 76 | 460 | 360 | 720 | 1500 | 2.4 | 0.95 |
| Comp. Example 3 | 78 | 530 | 320 | 630 | 1400 | 1.5 | 1.03 |
| Example 5 | 151 | 440 | 490 | 1400 | 3000 | 0.5 | 0.85 |
| Example 6 | 130 | 380 | 400 | 1400 | 2600 | 1.0 | 1.64 |
| Comp. Example 4 | 83 | 470 | 330 | 700 | 1500 | 2.4 | 0.88 |

APPLICATION EXAMPLE

The 1-butene/propylene copolymer obtained in Example 6 and a polypropylene resin ([η]=2.0; ethylene content 2.0 mole %) were mixed in the molten state at a rate of 1:3. The molten mixture was molded into a T-die film having a thickness of 30 microns in an ex-

What we claim is:

1. A random copolymer consisting essentially of 65 to 99 mole % of 1-butene and 35 to 1 mole % of propylene, and having (A) a boiling methyl acetate-soluble content of not more than 2% by weight based on the weight of the copolymer,
(B) an intrinsic viscosity ($\eta$), determined in decalin at 135° C., of 1 to 5 dl/g,
(C) a n-decane/acetone (1:1 by volume) mixture-soluble content in % by weight based on the weight of the copolymer of less than the value calculated by $4\times(\eta)^{-1.2}$,
(D) a DSC melting point, determined by a differential scanning calorimeter, of 50° to 130° C.,
(E) a yield strength, measured by JIS K-7113, of 50 to 300 kg/cm$^2$,
(F) an elongation at break, measured by JIS K-7113, of 200 to 1000%, and
(G) a tensile strength at break, measured by JIS K-7113, of 150 to 800 kg/cm$^2$.

2. The copolymer of claim 1 which consists essentially of 65 to 96 mole % of 1-butene and 35 to 4 mole % of propylene.

3. The copolymer of claim 1 which further has (H) a torsional rigidity, measured by JIS K6745, of 500 to 3,000 kg/cm$^2$.

4. The copolymer of claim 1 or 3 which further has (I) a Young's modulus, measured by JIS K7113, of 1,000 to 6,000 kg/cm$^2$.

5. The copolymer of claim 1 wherein the elongation at break is not less than 300%.

6. The copolymer of claim 1 wherein the tensile strength at break (G) is not less than 200 kg/cm$^2$.

7. The copolymer of claim 1 wherein the boiling methyl acetate-soluble content (A) is not more than 1% by weight based on the weight of the copolymer.

8. The copolymer of claim 1 wherein the boiling methyl acetate-soluble content (A) is not more than 0.5% by weight based on the weight of the copolymer.

9. The copolymer of claim 1 wherein the n-decane/acetone mixture-soluble content (C) is less than the value calculated by $3.5\times(\eta)^{-1.2}(\%)$.

10. The copolymer of claim 1 wherein (D) the DSC melting point determined by the differential scanning calorimeter, is from 70° to 125° C.

11. The copolymer of claim 1 wherein the yield strength (E) is not less than 100 kg/cm$^2$.

12. The copolymer of claim 1 wherein the yield strength (E) is from 110 to 200 kg/cm$^2$, the elongation at break (F) is from 350 to 1,000%, and the tensile strength at break (G) is from 250 to 600 kg/cm$^2$.

* * * * *